3,726,682
PHOTOGRAPHIC MATERIALS WITH ALKALI-SOLUBLE ANTIHALATION LAYER
August Jean Van Paesschen, Antwerp, Joseph Antoine Herbots, Edegem, and Lucien Janbaptist Van Gossum, Kontich, Belgium, assignors to Agfa-Gevaert N.V., Mortsel, Belgium
No Drawing. Filed Feb. 16, 1971, Ser. No. 115,806
Claims priority, application Great Britain, Feb. 17, 1970, 7,587/70; Oct. 20, 1970, 49,791/70
Int. Cl. G03c 1/84
U.S. Cl. 96—84 R                    3 Claims

ABSTRACT OF THE DISCLOSURE

The invention describes an antihalation layer for use in a photographic film material. The antihalation layer is applied to the side of the hydrophobic film support opposite to the light-sensitive layer and comprises an antihalation dye or pigment dispersed in a water-insoluble, alkali-soluble copolymer of vinyl acetate and crotonic acid comprising between 5 and 20% by weight of crotonic acid.

The antihalation layer dissolves away in alkaline developing baths or after treatment in a highly alkaline preliminary bath, readily dissolves in water.

The elimination of the antihalation layer in a developing bath or in water when a preliminary bath is used, may be facilitated by applying between the antihalation layer and the film support an intermediate layer formed from a mixture of 1 to 3 parts by weight of a cellulose ester and 3 to 1 parts by weight of at least one alkali-soluble polymer.

---

This invention relates to photographic materials and particularly to photographic elements carrying light-sensitive silver halide emulsion layers.

The problem of reducing halation in sensitive photographic materials is well known. Halation arises as a consequence of the reflection of light by the film support onto the light-sensitive coating or coatings. It is usually neutralized by applying to the side of the film support opposite to the emulsion layer or layers, a light-absorbing layer, which is generally called an antihalation layer. Such an antihalation layer may consist of a dye or pigment dispersed in a natural or synthetic binder. There is either selected a dye or pigment that is decolourised during the processing of the photographic element, or a natural or synthetic binder that is soluble in a processing bath. Both alternatives may be combined also.

According to the invention there is provided an antihalation coating composition comprising a water-insoluble, alkali-soluble copolymer of vinyl acetate and crotonic acid having dispersed therein an antihalation dye or finely divided antihalation pigment, said copolymer comprising from 5 to 20% by weight of crotonic acid.

The dyes used in the antihalation layer may belong to almost all known classes of dyes, but especially to the class of triaryl methane, oxonol, merocyanine, arylidene, pyrrolocyanine, and styryl dyes. If a pigment is used, carbon black is preferred though sometimes colloidal silver can be taken.

When using black inert pigments, the amount thereof may vary over a fairly wide range but they should be present in sufficient amounts so that their layers prevent visible light from penetrating therethrough. A particle size of 10 to 100 nm. represents a practical range and 20 to 80 nm. a preferred range for the aforesaid pigments.

The quantity of black inert pigment dispersed in the binder may vary from 1 to 2 parts by weight of pigment to 1 to 20 parts of binder.

The thickness of the antihalation layer is not critical, though generally thicknesses of 0.5 to $3\mu$ are used. The thickness of the layer and the amount of pigment should be regulated so that the resulting layer has an optical density of about 0.5 to 3.

The copolymer in its acid form is insoluble in water. In an alkaline photographic developer, however, the copolymer dissolves readily since it is converted therein to the sodium salt.

In certain development systems of colour photography there is used a preliminary bath, i.e. a highly alkaline bath with a high concentration of inorganic salts such as sodium sulphate. The polymers of the invention do not dissolve in this preliminary bath as a result of a salting-out effect due to the high concentration of inorganic salts present. In the subsequent intermediate rinsing with water before entering the first developer bath they can be brushed away very easily.

It may be vary interesting to add to the coating composition of the antihalation layer a small amount of a wetting agent such as an alkali metal alkyl sulphate of 8 to 20 carbon atoms, e.g. sodium octyl sulphate, sodium tetradecyl sulphate, sodium hexadecyl sulphate, ammonium octadecyl sulphate, and sodium oleyl sulphate.

It may be very interesting also to add to the coating composition of the antihalation layer a minor amount of polyvinylpyrrolidone or of a copolymer of vinylpyrrolidone or of another hydrophilic colloid.

The antihalation coating composition may be applied to the hydrophobic film support by spray, brush, roller, doctor blade, air brush, or wiping techniques. Examples of hydrophobic film supports are films of cellulose triacetate, polyalkylene terephthalates, or polycarbonates.

In certain cases, especially when polyalkylene terephthalate films such as a film of polyethylene terephthalate are used as the hydrophobic film support whereupon the antihalation coating composition of the invention is to be applied, it may be preferable to provide the support, before application of the antihalation layer, with a known subbing layer, or to pretreat the support superficially according to known techniques. For instance, the polyester film support may be provided with a subbing layer, comprising a copolymer of at least one of the chlorine-containing monomers vinylidene chloride and vinyl chloride. This subbing layer has been described in our French patent specification 1,582,378 filed Sept. 25, 1968. Good results are also obtained when the surface of the subbing layer is exposed to a high voltage electric corona discharge such as described in our United Kingdom patent application 58,350/68 filed Dec. 9, 1968. Sometimes an electric corona discharge treatment of the polyester film support itself may suffice.

The polyester film support surface may also be treated with a solution of a swelling agent for the polyester such as described in our United Kingdom patent application 29,577/69 filed Aug. 7, 1969.

In order to facilitate the elimination of the antihalation layer in the developing bath, or during a separate rinsing with water when a preliminary bath of high alkalinity is used, there may be applied between the hydrophobic film support and the antihalation layer an intermediate layer which is formed from a mixture of 1 to 3 parts by weight of a cellulose ester, e.g. cellulose diacetate and 3 to 1 parts by weight of at least one alkali-soluble polymer.

Since in the intermediate layer the cellulose ester itself is not alkali-soluble, it is only the alkali-soluble polymer that dissolves away, thus leaving a thin layer of cellulose ester on the hydrophobic film support.

Suitable alkali-soluble polymers for use in the intermediate layer are e.g.:

partially or completely sulphonated polystyrene
co(styrene/maleic acid)
partially or completely nitrated co(styrene/maleic acid)
co(vinyl acetate/maleic acid) (50:50 mole percent)
co(vinyl acetate/crotonic acid) (94:6% by weight)
co(styrene/acrylic acid) 70:30% by weight)
co(styrene/methacrylic acid) 30:70% by weight)

whereby these polymers and copolymers may be applied in their acid form or as alkali metal salts.

Suitable cellulose esters for use in admixture with the alkali-soluble polymers are cellulose triacetate and especially cellulose diacetate having an acetic acid content between 52% and 60% by weight.

The manufacture of the copolymers of vinyl acetate and crotonic acid useful as binding agents in the antihalation layers of the invention is exemplified in the following preparations.

PREPARATION 1

A reaction vessel is equipped with a stirrer, a reflux condenser, a thermometer and a tube for bubbling nitrogen through the solution.

In the reaction vessel 190 g. of vinyl acetate are mixed with 10 g. of crotonic acid and 600 mg. of azobisisobutyronitrile. The solution is refluxed gently whilst stirring and nitrogen is allowed to bubble through the solution. The temperature rises to 74° C.

After 2 hours a viscous solution is obtained. 50 ml. of methanol are added, so that the reflux temperature falls to approximately 69° C. The viscosity increases again, so that there must be diluted repeatedly with methanol. After a total reaction time of 5 hours 50 ml. of methanol are added indeed, and after 7 and 8 hours there are added 50 ml. more each time. After 14 hours the viscous solution is diluted with methanol and then poured out in water for isolating the copolymer formed. This copolymer is a sticky residue and is soluble in alkaline medium.

Yield: 127 g. of copolymer of vinylacetate and crotonic acid comprising 7.8% by weight of crotonic acid.

PREPARATION 2

The process of preparation 1 is repeated but starting with the following reagents: 180 g. of vinyl acetate and 20 g. of crotonic acid and 600 mg. of azobisisobutyronitrile.

Yield: 141 g. of copolymer comprising 14.8% by weight of crotonic acid.

The invention is illustrated by the following examples.

Example 1

12.25 g. of polyvinylpyrrolidone were dissolved in 100 ml. of water. 15 g. of colloidal carbon having an average particle size of 23 nm. were dispersed in the resulting solution. The following components were added whilst stirring quickly to 80 ml. of the thus formed dispersion:

150 ml. of a 22.9% solution in methanol of co(vinyl acetate/crotonic acid) (85.3:14.7% by weight) from preparation 2
150 ml. of ethanol
8 ml. of a 25% aqueous solution of ammonium hydroxide.

The resulting composition was diluted with 620 ml. of water, filtered, and admixed whilst stirring with 10 ml. of a 10% silicon dioxide dispersion in ethylene glycol monomethyl ether. The particle size of the silicon dioxide was approximately 3.3μ.

The suspension formed was applied to one side of a cellulose triacetate film in such a way, that a material having an optical density of approximately 1.2 was obtained. The dried layer was coated with a covering layer of 0.2% of carnauba wax in a mixture of 40 parts by volume of perchloroethylene and 60 parts by volume of n-hexane.

The other side of the cellulose triacetate film was coated with a known subbing layer and subsequently with a gelatin silver halide layer. The antihalation layer adhered very well to the cellulose triacetate support.

The photographic film was exposed image-wise and then fed through a preliminary bath having the following composition:

Water _____l__ 1
Sodium sulphite _____g__ 100
Sodium tetraborate _____g__ 20
Sodium hydroxide till pH 9.4 was obtianed.

As a result of this treatment the antihalation layer could be washed away completely with pure water. It was only then that the material was developed, washed and fixed in the normal baths.

Example 2

21 g. of co(vinyl acetate/crotonic acid) comprising 14.8% by weight of crotonic acid and obtained according to preparation 2, were dissolved in 275 ml. of methanol and 6 ml. of ammonium hydroxide (25%). A solution of 3.5 g. of polyvinylpyrrolidone in 100 ml. of methanol was added thereto. Subsequently the mixture was diluted with 50 ml. of ethanol and 75 ml. of water. 12.5 g. of colloidal carbon having a particle size of approximaely 50 nm. were dispersed therein. The very fine dispersion was diluted with 375 ml. of methanol, 50 ml. of ethanol and 75 ml. of water, then filtered, and admixed with 5 ml. of a 20% aqueous methylene starch dispersion.

The final dispersion was coated on a cellulose triacetate support in such a way that a layer having a density of approximately 0.8 was formed.

The other side of the polyester film was provided with the layers necessary for making a light-sensitive photographic film including subbing layer or layers and a silver halide emulsion layer or layers.

The antihalation layer adhered very well to the cellulose triacetate support and it could be washed away completely with water after a treatment with a preliminary bath as described in Example 1.

Example 3

30 g. of co(vinyl acetate/crotonic acid) comprising 7.8% by weight of crotonic acid and obtained according to preparation 1, were dissolved in 800 ml. of ethanol and 200 ml. of ethylene chlorohydrine. 15 ml. of a 40% by weight aqueous dispersion of co(ethyl acrylate/N-vinylpyrrolidone) (90:10% by weight) were added thereto. Whilst rapidly stirring 15 g. of colloidal carbon having a particle size of approximately 25 nm. were dispersed therein. The resulting dispersion was coated on a dimensionally oriented polyethylene terephthalate film in such a way that upon drying at 100 to 110° C. a material having a density of approximately 1.5 was obtained.

A photographic film was made by applying to the other side of the support the necessary subbing layer and silver halide emulsion layers for a colour film.

The antihalation layer adhered very well to the polyester film and dissolved completely by rubbing in water after a treatment with a preliminary bath as described in Example 1.

Example 4

40 ml. of a 30% by weight solution of a co(vinyl acetate/crotonic acid) comprising 7.8% by weight of crotonic acid and obtained according to preparation 1, in water that had been adjusted to pH 8 by the addition of ammonium hydroxide, were added to 200 ml. of water, 180 ml. of methanol and 7.6 ml. of a 40% aqueous solution of the phosphorous compound according to the following structural formula:

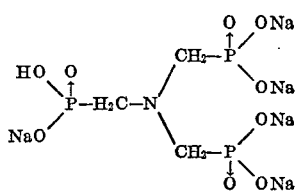

11.2 g. of carbon black having a particle size of approximately 50 nm. were dispersed therein.

The finely divided carbon black dispersion was diluted with 90 ml. of a same 30% by weight solution of co(vinyl acetate/crotonic acid) and 420 ml. of water and 70 ml. of methanol, and then filtered.

A dimensionally oriented polyethylene terephthalate film support was provided with a subbing layer as described in our French patent specification 1,582,378 filed Sept. 25, 1968. The dried film support was then covered with an antihalation layer from the above described carbon dispersion in such a way that upon drying a material having a density of approximately 1.2 was obtained. In order to reduce the friction coefficient this layer was then covered with a layer of a 0.2% carnauba wax solution in perchloroethylene.

The other side of the support was coated with the necessary light-sensitive layers for forming a photographic film material.

The antihalation layer adhered very well to the support, it was resistant to abrasion, and it could be washed away very easily in water after a treatment with a preliminary bath as described in Example 1.

Example 5

In a mixture of 30 g. of co(vinyl acetate/crotonic acid) comprising approximately 7% by weight of crotonic acid, 800 ml. of water, 200 ml. of ethanol and 5 ml. of 26% ammoniacal solution the following dyes were dissolved:

(a) 15 g. of the green dye according to the structural formula:

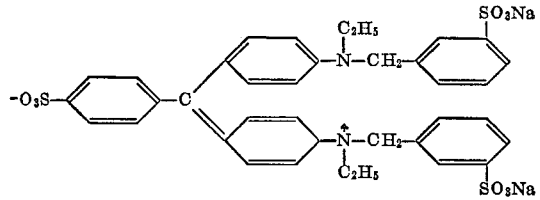

(b) 10 g. of the red dye according to the structural formula:

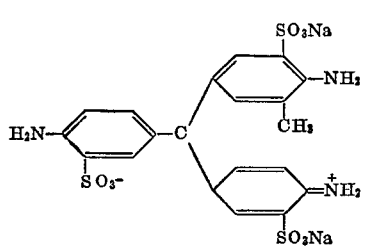

and (c) 6 g. of the yellow dye according to the following structural formula:

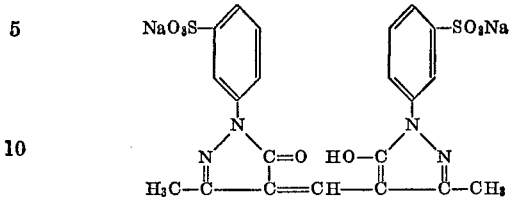

The resulting solution was applied to one side of a cellulose triacetate film support in such a way, that upon drying a material having a density of approximately 1.3 was obtained. In order to reduce the sensitivity to water as well as the dye transfer of the layer, the latter layer is coated with a 1% solution in 50 parts by volume of acetone and 50 parts by volume of methylene chloride of an alkali soluble polymer, e.g. an oil-free pentaerythritephthalate resin.

The other side of the support was coated with the necessary light-sensitive layers to form a panchromatic photographic film material.

The antihalation layer adhered very well to the support and was decolourised completely after a treatment of 2 minutes in the developing bath.

Example 6

One side of a cellulose triacetate film support was coated at a ratio of 1 liter/27 sq. m. with an intermediate layer having the following composition:

| | |
|---|---|
| Cellulose diacetate (acetic acid content 56% by weight) _____g__ | 7.5 |
| Co(vinyl acetate/maleic acid) (50:50 mole percent) _____g__ | 7.5 |
| Methanol _____ml__ | 75 |
| n-Butanol _____ml__ | 75 |
| Acetone _____ml__ | 850 |

The dried layer thus formed was coated at a ratio of 1 litre/40 sq. m. with an antihalation layer having the following composition:

13 g. of colloidal carbon having an average particle diameter of 23 nm. was dispersed in a mixture of:

| | |
|---|---|
| Co(vinyl acetate/crotonic acid) (94.6% by weight _____g__ | 24 |
| Co(styrene/acrylic acid) (70:30% by weight) __g__ | 8 |
| Methanol _____ml__ | 600 |
| Water _____ml__ | 400 |
| Ammonium hydroxide (25% by weight of ammonia) _____ml__ | 10 |

The other side of the cellulose triacetate film support was provided with the layers necessary for making a light-sensitive colour photographic material including subbing layer or layers and silver halide emulsion layers.

After treatment in a preliminary bath such as described in Example 1, the antihalation layer was completely eliminated with a jet of water without rubbing. When the co(vinyl acetate/maleic acid) was omitted from the intermediate layer, rubbing was necessary to eliminate the antihalation layer completely.

Example 7

One side of a cellulose triacetate film support was coated at a ratio of 1 litre/35 sq. m. with an anticurl layer from the following composition:

| | Ml. |
|---|---|
| Cellulose acetate (56% by weight of acetic acid) as a 5% by weight solution in aceton _____ | 125 |
| Aceton _____ | 725 |
| Methanol _____ | 100 |
| n-Butanol _____ | 50 |

Meanwhile 54 g. of a 20% by weight colloidal dispersion of carbon black, the carbon particles of which had a diameter of approximately 250 A. and containing 2% by weight of anionactive dispersing agent, was added while stirring to the following solution:

|  | Ml. |
|---|---|
| Co(vinyl acetate/crotonic acid) (comprising 7.8% by weight of crotonic acid) as a 30% by weight solution in methanol | 77 |
| Methanol | 200 |
| Water | 100 |
| Ammonium hydroxide (25% by weight of ammonia) | 10 |

Further the following solution was prepared:

|  | Ml. |
|---|---|
| Co(styrene/acrylic acid) (70:30% by weight) as a 20% by weight solution in aceton | 20 |
| Methanol | 100 |
| Water | 430 |
| Ammonium hydroxide (25% by weight of ammonia) | 5 |
| Carnauba-wax dispersion in water (as a 10% by weight dispersion) | 20 |
| Coating aid of the formula | |

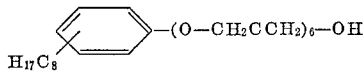

as a 10% by weight solution in methanol _____ 20

The above carnauba-wax dispersion was made as follows:

|  | G. |
|---|---|
| Carnauba-wax | 200 |
| Polyoxyethylene sorbitan monostearate | 20 |
| Sorbitanmonostearate | 20 |
| Oleylmethyl tauride sodium salt | 20 | were heated together until an homogeneous melt was obtained. The melt was poured in 2 l. of water at 95° C. while rapidly stirring for 2 minutes, and the resulting dispersion was quickly cooled at room temperature and filtered.

Both solutions, one containing co(vinyl acetate/crotonic acid), the other containing co(styrene/acrylic acid), were thoroughly mixed and coated as an antistress layer at a ratio of 1 litre/25 sq. m. on the above applied antihalation layer.

The other side of the cellulose triacetate film support was provided with the layers necessary to form a light-sensitive colour photographic material including subbing layer or layers and silver halide emulsion layers.

The antihalation layer adhered very well to the support, was resistant to scratching and was completely eliminated by rinsing with water after a treatment with a preliminary bath as described in Example 1.

We claim:

1. A photographic material comprising a hydrophobic support, on one side of said support at least one light-sensitive silver halide emulsion layer, and on the other side of said support an antihalation layer comprising a water-insoluble, alkali-soluble copolymer of vinylacetate and crotonic acid having an antihalation dye or pigment dispersed therein, said copolymer comprising from 5 to 20% by weight of crotonic acid.

2. A photographic material according to claim 1 wherein an intermediate layer is disposed between said antihalation layer and said support, said intermediate layer comprising a mixture of cellulose ester and an alkali-soluble polymer in a weight ratio of 1–3 to 3–1.

3. The photographic material of claim 1 wherein said antihalation layer has carbon black of a particle size of 10–100 nm. dispersed therein.

References Cited

UNITED STATES PATENTS

| 3,492,122 | 1/1970 | Takenaka et al. | 96—84 |
| 3,433,638 | 3/1969 | Ohi et al. | 96—84 |
| 2,077,789 | 4/1937 | Hagedorn et al. | 96—84 |
| 3,392,022 | 7/1968 | Gandy et al. | 96—84 |
| 3,291,611 | 12/1966 | Krajewski | 96—84 |

RONALD H. SMITH, Primary Examiner

U.S. Cl. X.R.

96—87 R; 252—300